(12) United States Patent
Moorman et al.

(10) Patent No.: US 8,403,793 B2
(45) Date of Patent: Mar. 26, 2013

(54) HYDRAULIC CONTROL SYSTEM FOR AN AUTOMATIC TRANSMISSION HAVING A LUBRICATION REGULATION VALVE

(75) Inventors: Steven P. Moorman, Dexter, MI (US); Chinar S. Ghike, Livonia, MI (US); John R. Czoykowski, Grosse Pointe Park, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 466 days.

(21) Appl. No.: 12/707,458

(22) Filed: Feb. 17, 2010

(65) Prior Publication Data

US 2011/0197982 A1    Aug. 18, 2011

(51) Int. Cl.
    *F16H 31/00* (2006.01)
(52) U.S. Cl. .................. 475/137; 475/116; 475/128
(58) Field of Classification Search .......... 475/136, 475/137, 116, 128
    See application file for complete search history.

(56) References Cited

U.S. PATENT DOCUMENTS

| | | | | |
|---|---|---|---|---|
| 2,910,942 | A * | 11/1959 | Thorman | 475/137 |
| 3,107,621 | A * | 10/1963 | Szady et al. | 475/137 |
| 3,164,034 | A * | 1/1965 | Kelley | 475/70 |
| 4,347,044 | A * | 8/1982 | Ahlen et al. | 475/137 |
| 4,653,352 | A | 3/1987 | Nakao et al. | |
| 4,944,202 | A | 7/1990 | Gierer | |
| 5,441,459 | A | 8/1995 | Inukai et al. | |
| 6,715,597 | B1 | 4/2004 | Buchanan et al. | |
| 7,300,375 | B2 | 11/2007 | Petrzik | |
| 7,487,866 | B2 | 2/2009 | Kruse et al. | |
| 2001/0036878 | A1 | 11/2001 | Itou et al. | |
| 2002/0060113 | A1 | 5/2002 | Harries | |
| 2002/0119864 | A1 | 8/2002 | Harries | |
| 2003/0075408 | A1 | 4/2003 | Alfredsson | |
| 2004/0038765 | A1 | 2/2004 | Fujimine et al. | |
| 2007/0175726 | A1 | 8/2007 | Combes et al. | |
| 2008/0207392 | A1 | 8/2008 | Staudinger et al. | |
| 2008/0210032 | A1 | 9/2008 | Uberti et al. | |
| 2009/0082153 | A1 * | 3/2009 | Fujikawa et al. | 475/137 |
| 2009/0151495 | A1 | 6/2009 | Garabello et al. | |
| 2009/0157271 | A1 * | 6/2009 | Garabello et al. | 74/473.11 |

FOREIGN PATENT DOCUMENTS

| | | |
|---|---|---|
| DE | 2141564 A1 | 2/1973 |
| DE | 4117736 C1 | 5/1992 |
| DE | 4320353 A1 | 1/1994 |
| DE | 29714652 U1 | 10/1997 |
| DE | 19921301 A1 | 11/1999 |
| DE | 19849488 A1 | 5/2000 |
| DE | 19931973 A1 | 1/2001 |
| DE | 10134115 A1 | 1/2003 |
| DE | 10243282 A1 | 4/2004 |

(Continued)

*Primary Examiner* — David D Le
*Assistant Examiner* — Derek D Knight

(57) ABSTRACT

A hydraulic control system for a transmission includes a first source of pressurized hydraulic fluid, a second source of pressurized hydraulic fluid, a lubrication subsystem for communicating a pressurized hydraulic fluid through the transmission, and a fluid control device in communication with the first source of pressurized hydraulic fluid. A lubrication regulation valve is in communication with the first and second sources of pressurized hydraulic fluid, the fluid control device, and the lubrication subsystem. The lubrication regulation valve allows fluid communication from the first source of pressurized hydraulic fluid to the lubrication subsystem when in a first position, the valve allows fluid communication from the first and second source of pressurized hydraulic fluid to the lubrication subsystem when in a second position, and the valve allows fluid communication from the first source of pressurized hydraulic fluid through the flow restriction device to the lubrication subsystem when in a third position.

18 Claims, 7 Drawing Sheets

FOREIGN PATENT DOCUMENTS

| | | |
|---|---|---|
| DE | 102005029963 A1 | 2/2007 |
| DE | 102005029964 A1 | 3/2007 |
| EP | 0477564 A2 | 4/1992 |
| EP | 1469235 A1 | 10/2004 |
| EP | 1519082 A1 | 3/2005 |
| EP | 1645786 A2 | 4/2006 |
| EP | 2151586 A2 | 2/2010 |
| FR | 2808065 A1 | 10/2001 |
| JP | 58102851 A | 8/1983 |
| JP | 2007010145 A | 1/2007 |
| WO | WO9705410 A1 | 2/1997 |
| WO | WO9919644 A1 | 4/1999 |
| WO | WO2009037170 A1 | 3/2009 |
| WO | WO2010028745 A2 | 3/2010 |

\* cited by examiner

HYDRAULIC CONTROL SYSTEM FOR AN AUTOMATIC TRANSMISSION HAVING A LUBRICATION REGULATION VALVE

TECHNICAL FIELD

The invention relates to a control system for an automatic transmission, and more particularly to an electro-hydraulic control system having a three position lubrication regulation valve.

BACKGROUND

A typical automatic transmission includes a hydraulic control system that is employed to provide cooling and lubrication to components within the transmission and to actuate a plurality of torque transmitting devices. These torque transmitting devices may be, for example, friction clutches and brakes arranged with gear sets or in a torque converter. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, torque converter clutch control subsystems, and shift actuator subsystems that include actuators that engage the torque transmitting devices. The pressurized hydraulic fluid delivered to the shift actuators is used to engage or disengage the torque transmitting devices in order to obtain different gear ratios.

While previous hydraulic control systems are useful for their intended purpose, the need for new and improved hydraulic control system configurations within transmissions which exhibit improved performance, especially from the standpoints of efficiency, responsiveness and smoothness, is essentially constant. Accordingly, there is a need for an improved, cost-effective hydraulic control system for use in a hydraulically actuated automatic transmission.

SUMMARY

A hydraulic control system for a transmission is provided. The hydraulic control system includes a first source of pressurized hydraulic fluid for providing a first flow of hydraulic fluid, a second source of pressurized hydraulic fluid for providing a second flow of hydraulic fluid, a lubrication subsystem for communicating a pressurized hydraulic fluid to a plurality of components in the transmission in order to provide lubrication, and a fluid control device in communication with the first source of pressurized hydraulic fluid. A lubrication regulation valve is in communication with the first and second sources of pressurized hydraulic fluid, the fluid control device, and the lubrication subsystem. The lubrication regulation valve includes a valve moveable between at least three positions. The valve allows fluid communication from the first source of pressurized hydraulic fluid to the lubrication subsystem when in the first position, the valve allows fluid communication from the first source and the second source of pressurized hydraulic fluid to the lubrication subsystem when in the second position, and the valve allows fluid communication from the first source of pressurized hydraulic fluid through the flow restriction device to the lubrication subsystem when in the third position.

In one example of the present invention, the fluid control device is a flow restriction orifice operable to reduce the first flow of hydraulic fluid from the first source of pressurized hydraulic fluid.

In another example of the present invention, the first source of pressurized hydraulic fluid is a cooler subsystem in communication with a pump.

In yet another example of the present invention, the second source of pressurized hydraulic fluid is a valve assembly in communication with a pump for providing pressurized hydraulic fluid and the valve assembly is operable to regulate a pressure of the hydraulic fluid from the pump.

In yet another example of the present invention, the valve is moved between the first and second positions by a first force acting on a first end of the valve and by a second force acting on a second end of the valve.

In yet another example of the present invention, the first force is from a flow of hydraulic fluid from a pump and the second force is from a biasing member acting on the valve and a feedback flow of hydraulic fluid from the lubrication control valve that is communicated back to the lubrication control valve.

In yet another example of the present invention, a control device is operatively associated with the second end of the valve, and the valve is moved to the third position by the control device.

In yet another example of the present invention, the control device is an on/off solenoid that communicates a flow of hydraulic fluid to the second end of the valve, and the flow of hydraulic fluid from the control device acts on the valve and moves the vale to the third position.

In yet another example of the present invention, the position of the valve is a function of a fluid flow from a pump acting on the valve, a biasing member acting on the valve, a feedback flow of hydraulic fluid from the lubrication control valve acting on the valve, and a control signal acting on the valve from a control device.

Further objects, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1A:
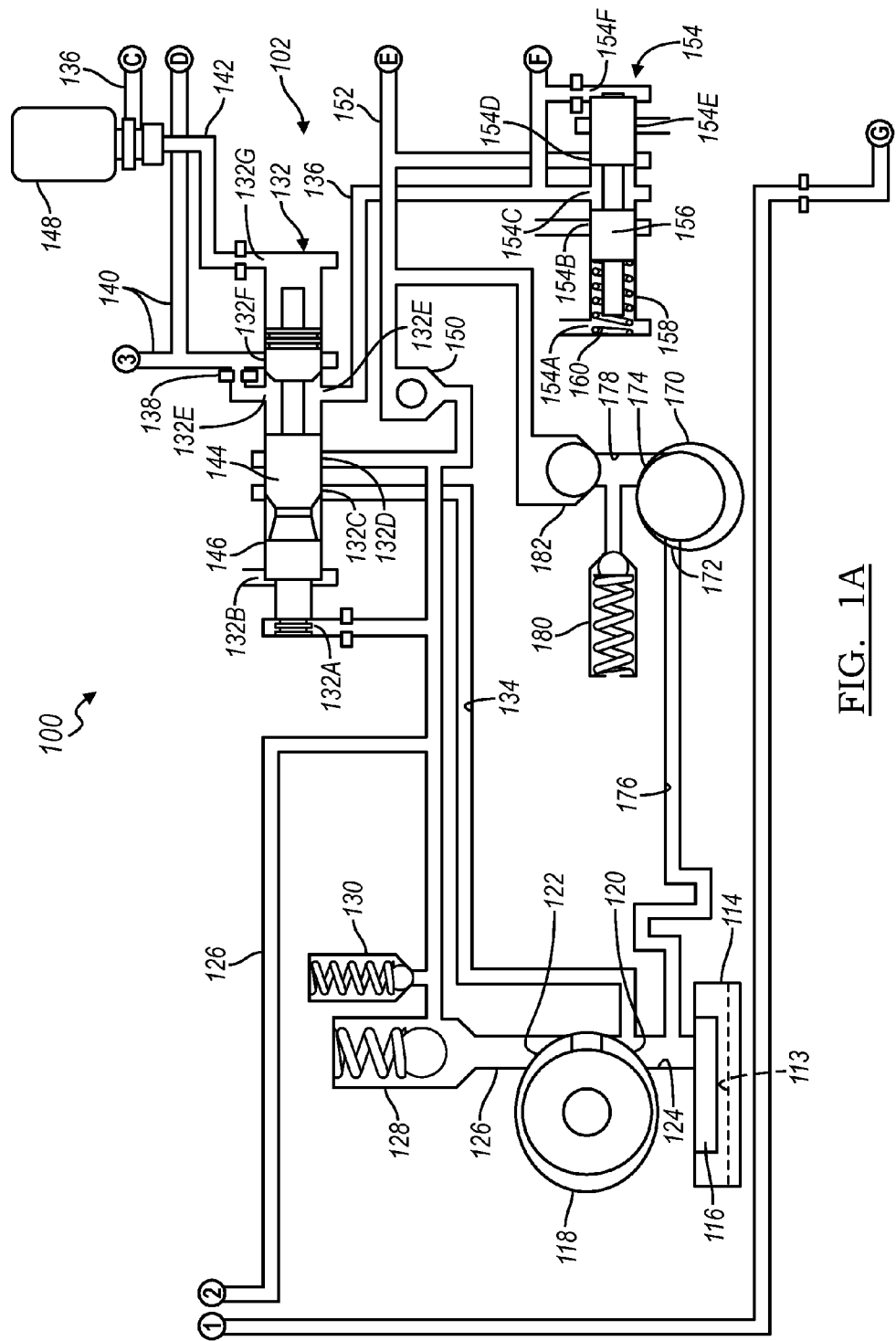
FIGS. 1A-1D is a diagram of a hydraulic control system according to the principles of the present invention.

With combined reference to FIGS. 1A-1D, a hydraulic control system according to the principles of the present invention is generally indicated by reference number 100. The hydraulic control system 100 is operable to control torque transmitting mechanisms, such as synchronizers, clutches, and brakes within a transmission, as we as providing lubrication and cooling to components within the transmission and to control a torque converter coupled to the transmission. The hydraulic control system 100 includes a plurality of interconnected or hydraulically communicating subsystems including a pressure regulator subsystem 102, a torque converter control subsystem 104, a cooler flow subsystem 106, a lubrication control subsystem 108, an electronic transmission range selection (ETRS) control subsystem 110, and a clutch control subsystem 112.

With reference to FIG. 1A, the pressure regulator subsystem 102 is operable to provide and regulate pressurized hydraulic fluid 113, such as oil, throughout the hydraulic control system 100. The pressure regulator subsystem 102 draws hydraulic fluid 113 from a sump 114. The sump 114 is a tank or reservoir preferably disposed at the bottom of a transmission housing to which the hydraulic fluid 113 returns and collects from various components and regions of the transmission. The hydraulic fluid 113 is forced from the sump 114 and communicated through a sump filter 116 and throughout the hydraulic control system 100 via a pump 118. The pump 118 is preferably driven by an engine (not shown) and may be, for example, a gear pump, a vane pump, a gerotor pump, or any other positive displacement pump. The pump 118 includes an inlet port 120 and an outlet port 122. The inlet port 120 communicates with the sump 114 via a fluid line 124. The outlet port 122 communicates pressurized hydraulic fluid 113 to a fluid line 126. The fluid line 126 is in communication with a spring biased one-way valve 128, a spring biased blow-off safety valve 130, and a pressure regulator valve 132. The one-way valve 128 is used to selectively prevent hydraulic flow into the main pump 118 when the main pump 118 is non-operational. The safety valve 130 is set at a relatively high predetermined pressure and if the pressure of the hydraulic fluid in the fluid line 126 exceeds this pressure, the safety valve 128 opens momentarily to relieve and reduce the pressure of the hydraulic fluid.

The pressure regulator valve assembly 132 includes ports 132A-G. Port 132A is in communication with fluid line 126. Port 132B is an exhaust port that communicates with the sump 114. Port 132C is in communication with a fluid line 134 that communicates with fluid line 124 (i.e. feeds back into the inlet port 120 of the pump 118). Port 132D is in communication with fluid line 126. Fluid port 132E is in communication with a fluid line 136 and via a flow restriction orifice 138 with a fluid line 140. Fluid port 132F is in communication with the fluid line 140. Fluid line 140 trifurcates into at least three parallel branches 140A, 140B, and 140C each having located therein variously sized flow restriction orifices 141A, 141B, and 141C, respectively, shown in FIG. 1B. Finally, port 132G is in communication with a fluid line 142.

The pressure regulator valve assembly 132 further includes a valve 144 slidably disposed within a bore 146. The valve 144 automatically changes position to dump excess flow from fluid line 126 until a pressure balance is achieved between the commanded pressure and the actual pressure. The valve 144 is modulated by a variable bleed solenoid 148 that communicates with fluid line 142. For example, the solenoid 148 commands a fluid pressure by sending pressurized hydraulic fluid to port 132G to act on the valve 144. Simultaneously, fluid pressure from fluid line 126 enters port 132A and acts on the opposite side of the valve 144. Pressure balance between the commanded pressure from the solenoid 148 and pressure within line 126 is achieved as the valve 144 moves and allows selective communication between port 132D and port 132C, thereby bleeding pressure from fluid line 126.

Fluid line 126 also communicates downstream of the pressure regulator valve assembly 132 with a one-way valve 150.

The one-way valve 150 allows fluid communication from fluid line 126 to a fluid line 152 and prevents fluid communication from fluid line 152 to fluid line 126. Fluid line 152 communicates with a feed limit valve assembly 154.

The feed limit valve assembly 154 limits the maximum pressure of hydraulic fluid to the torque converter control subsystem 104, the cooler control subsystem 106 as well as various control solenoids, as will be described below. The feed limit valve assembly 154 includes ports 154A-F. Ports 154C and 154F are in communication fluid line 136 and therefore port 132E of the pressure regulator valve 132. Port 154D is in communication with fluid line 152. Ports 154A, 154B, and 154E are exhaust ports that communicate with the sump 114.

The feed limit valve assembly 154 further includes a valve 156 slidably disposed within a bore 158. The valve 156 automatically changes position to reduce flow from fluid line 152 (i.e. line pressure from the pump 118) to fluid line 136. For example, the valve 156 is biased to a first position by a spring 160. In the first position, at least a partial flow of fluid from line 152 communicates from port 154D through the feed limit valve assembly 154 to port 154C and then to fluid line 136. As the pressure within fluid line 136 increases, feedback pressure acting on the valve 156 via port 154F moves the valve 156 against the spring 160, thereby further reducing the pressure of the hydraulic fluid within fluid line 136, until a pressure balance is achieved on the valve 156. By controlling the pressure to fluid line 136 which communicates through the pressure regulator valve 132 to fluid line 140, the feed limit valve 154 controls the maximum pressure feeding the TCC control subsystem 104 and the lubrication control subsystem 108.

The pressure regulator subsystem 102 further includes an alternate source of hydraulic fluid that includes an auxiliary pump 170. The auxiliary pump 170 is preferably driven by an electric engine, battery, or other prime mover (not shown) and may be, for example, a gear pump, a vane pump, a gerotor pump, or any other positive displacement pump. The auxiliary pump 170 includes an inlet port 172 and an outlet port 174. The inlet port 172 communicates with the sump 114 via a fluid line 176. The outlet port 174 communicates pressurized hydraulic fluid to a fluid line 178. The fluid line 178 is in communication with a spring biased blow-off safety valve 180 and a one-way valve 182. The safety valve 180 is used to relieve excess pressure in fluid line 178 from the auxiliary pump 170. The one-way valve 182 is in communication with fluid line 152 and is operable to allow hydraulic fluid flow from fluid line 178 to fluid line 152 and prevent hydraulic fluid flow from fluid line 152 to fluid line 178. Therefore, during normal operating conditions, fluid flow from the pump 118 is prevented from backfilling the auxiliary pump 170 by the one-way valve 182. During high efficiency modes of operation when the engine, and therefore the pump 118, are inactive, and the auxiliary pump 170 is engaged, fluid flow from the auxiliary pump 170 is prevented from backfilling the pump 118 by the one-way valve 150.

Figure 1B:
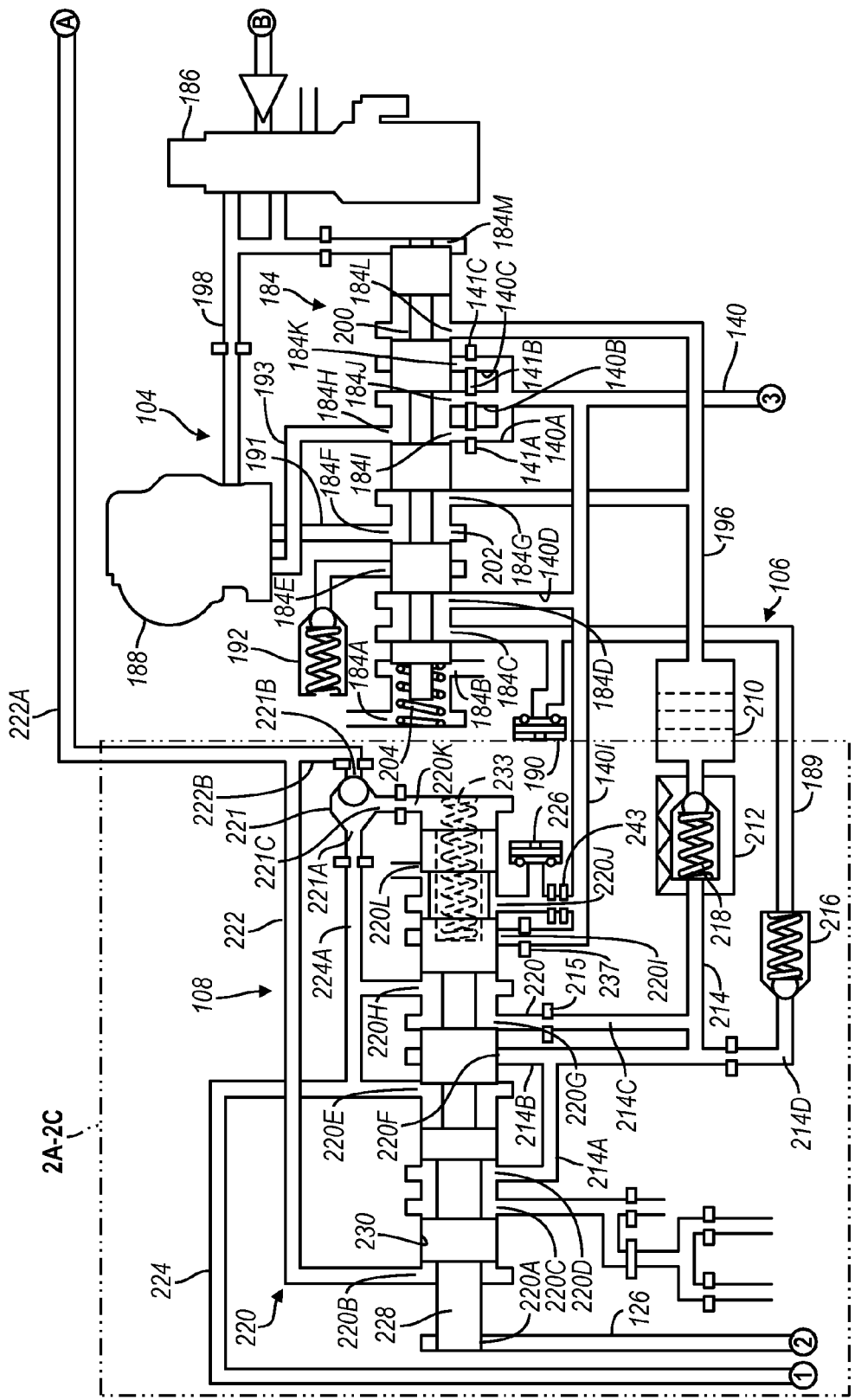

With specific reference to FIG. 1B, the TCC subsystem 104 receives pressurized hydraulic fluid from the feed limit valve assembly 154 and the pressure regulator valve assembly 132 via fluid line 140. The TCC subsystem 104 includes a TCC control valve 184 and a solenoid 186 that modulates pressure to a torque converter clutch 188.

The TCC control valve assembly 184 includes ports 184A-M. Ports 184A and 184B are exhaust ports that communicate with the sump 114. Ports 184I, 184J, and 184K are each in communication with branches 140A, 140B, and 140C of fluid line 140, respectively. Port 184C communicates with a fluid line 189. Fluid line 189 communicates with a TCC control valve pressure switch 190. Port 184D communicates with a branch 140D of fluid line 140. Port 184E communicates with a safety blow-off valve 192 that release pressurized hydraulic fluid when the torque converter clutch 188 is on or engaged. Port 184F communicates with the torque converter clutch 188 via a fluid line 191. Ports 184G and 184L communicate with a fluid line 196. Port 184H communicates with the torque converter clutch 188 via a fluid line 193. Finally, port 184M communicates with a fluid line 198. Fluid line 198 communicates with the solenoid 186 and with the torque converter clutch 188. The solenoid 186 is preferably a high flow, direct acting variable force solenoid, though other types of actuating devices may be employed without departing from the scope of the present disclosure.

The TCC control valve assembly 184 further includes a valve 200 slidably disposed within a bore 202. The valve 200 is actuated by the solenoid 186 that actuates the valve 200 against a spring 204. In a first position with the valve 200 not shifted against the spring 204 (i.e. a de-stroked position), hydraulic fluid from fluid line 140 is directed through the branches 140A-B and orifices 141A-B to ports 184I and 184J, through the valve assembly 184 to port 184H, and then to the torque converter clutch 188. The output of the torque converter clutch 188 communicates through line 191 to port 184F of the TCC control valve assembly 184, from port 184F to port 184G and on to the cooler control subsystem 106. The valve 200 is shifted against the spring by activation of the solenoid 186. As pressure of the hydraulic fluid acting on the valve 200 from port 184M via the solenoid 186 increases, a threshold is crossed where the valve 200 is shifted against the spring 204. As the valve 200 shifts, hydraulic fluid from fluid line 140 is directed through the branches 140A-C and orifices 141A-C, thereby controlling the rate of hydraulic fluid flow to port 184H and therefore the rate of hydraulic fluid flow to the torque converter clutch 188. For example, as the valve 200 shifts, port 184K communicates with port 184L, thereby bleeding off flow from fluid line 140 to fluid line 196, and port 184J closes thereby further reducing the fluid flow to port 184H. As the valve 200 shifts completely against the spring 204, the valve 200 diverts the output from the torque converter clutch 188 via port 184F to port 184E such that the hydraulic fluid leaving the torque converter clutch 188 returns to the sump 114 via the blow-off valve 192. Accordingly, the TCC control valve 184 controls the flow rate of hydraulic fluid to the torque converter clutch 188 and to the oil cooler subsystem 106.

The cooler control subsystem 106 includes an oil cooler 210 and a fine micron oil filter 212. The oil cooler 210 is in communication with fluid line 196. The oil filter 212 is in communication with the oil cooler 210 and with a fluid line 214. Fluid line 214 includes three branches 214A-C that communicate with the lubrication control subsystem 108 and a fourth branch 214D that communicates with a spring biased one-way valve 216. Branch 214C includes a flow restricting orifice 215, or override orifice, used to control fluid flow through the lubrication subsystem 108, as will be described in greater detail below. The one-way valve 216 communicates with fluid line 189. If the pressure of the hydraulic fluid in the fluid line 214D exceeds a pressure threshold, the one-way valve 216 opens momentarily to relieve and reduce the pressure of the hydraulic fluid within fluid line 214D. The cooler control subsystem 106 further includes a spring biased blow-off safety valve 218 disposed either in parallel with the oil filter 210 or integrated within the oil filter 210 that allows hydraulic fluid to bypass the oil filter 210 in the event of inadequate cooler flow. The blow-off valve 218 is set at a predetermined pressure and if the pressure of the hydraulic fluid in the fluid line 196 exceeds this pressure, the blow-off valve 218 opens momentarily to increase the flow of hydraulic fluid from the cooler flow subsystem 106.

The lubrication control subsystem 108 regulates lubrication fluid pressure as a function of line pressure delivered from the pump 118 or auxiliary pump 170. Hydraulic fluid regulated by the lubrication control subsystem 108 lubricates and cools the various moving parts of the transmission and provides the source of hydraulic fluid for filling a clutch centrifugal compensator. The lubrication control subsystem 108 receives hydraulic fluid from the cooler flow subsystem 106 via fluid line 214.

The lubrication control subsystem 108 includes a lubrication regulator valve assembly 220 and a ball check valve 221. The ball check valve 221 includes three ports 221A-C. The ball check valve 221 closes off whichever of the ports 221A and 221B that is delivering the lower hydraulic pressure and provides communication between whichever of the ports 221A and 221B having or delivering the higher hydraulic pressure and the outlet port 221C.

The lubrication regulator valve assembly 220 includes ports 220A-L. Port 220A communicates with fluid line 126 and therefore receives line pressure from the pump 118. Port 220B communicates with a fluid line 222. Fluid line 222 includes two branches 222A and 222B. Branch 222A communicates with the ETRS subsystem 110 and branch 222B communicates with port 221B of the ball check valve 221. Ports 220C and 220L are exhaust ports that communicate with the sump 114. Port 220D communicates with fluid line 214A. Ports 220E and 220H communicate with a fluid line 224. Fluid line 224 includes a branch 224A that communicates with port 221A of the ball check valve 221. Ports 220I and 220J communicate with fluid line 140 and with a pressure switch 226. Finally, port 220K communicates with port 221C of the ball check valve 221.

Figure 2A:
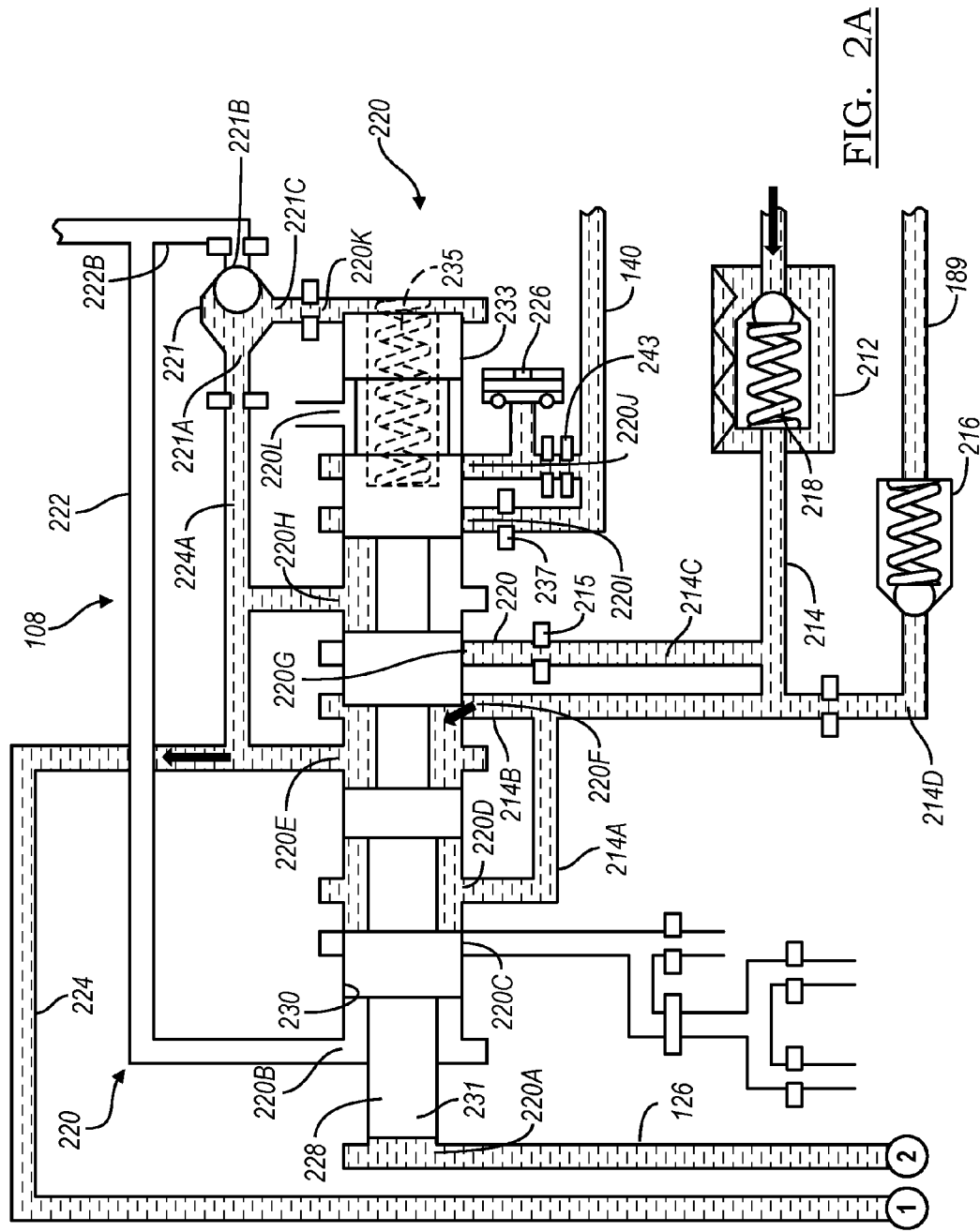
FIG. 2A is a diagram of a portion of the hydraulic control system in a first state according to the principles of the present invention.
Figure 2B:
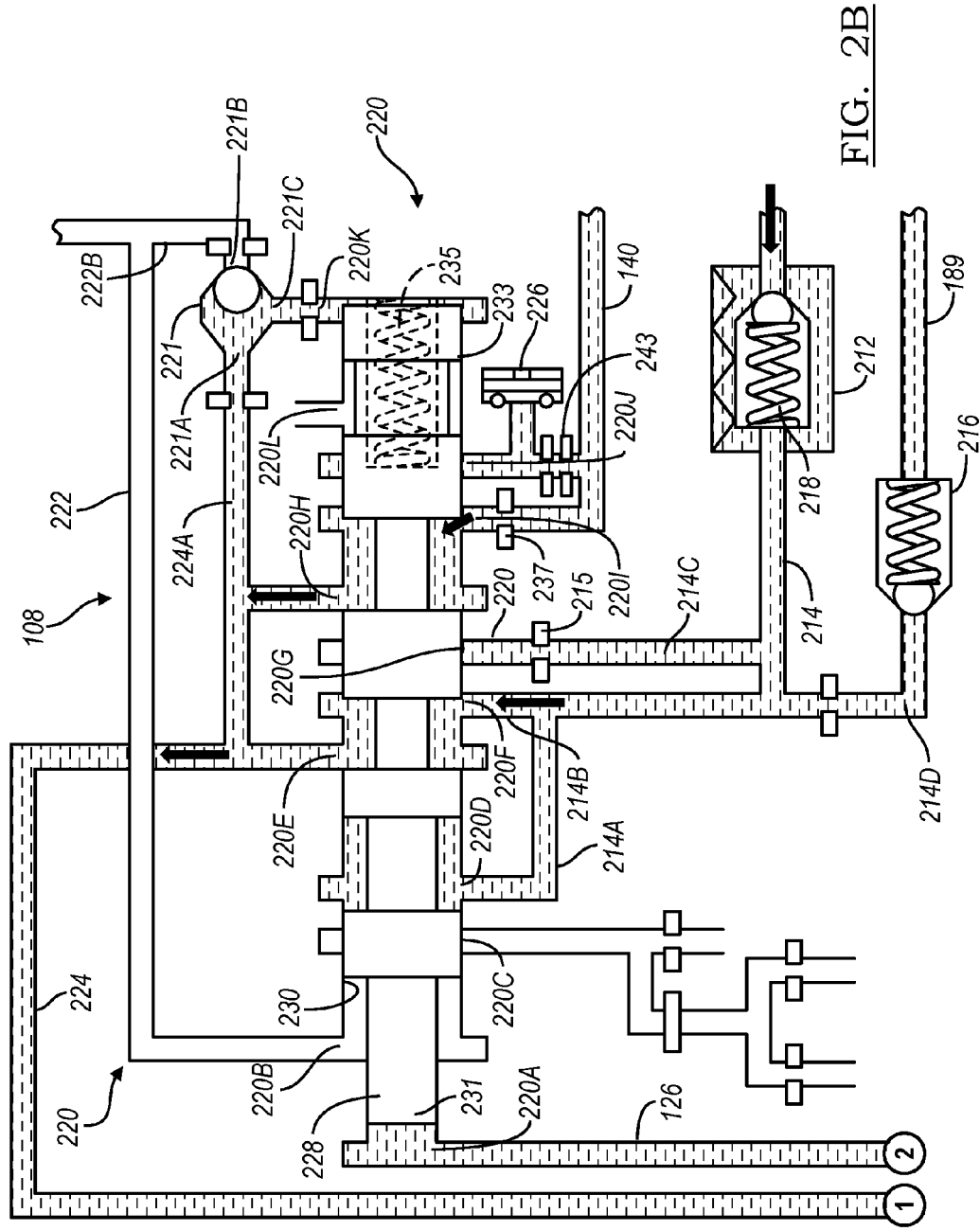
FIG. 2B is a diagram of a portion of the hydraulic control system in a second state according to the principles of the present invention.
Figure 2C:
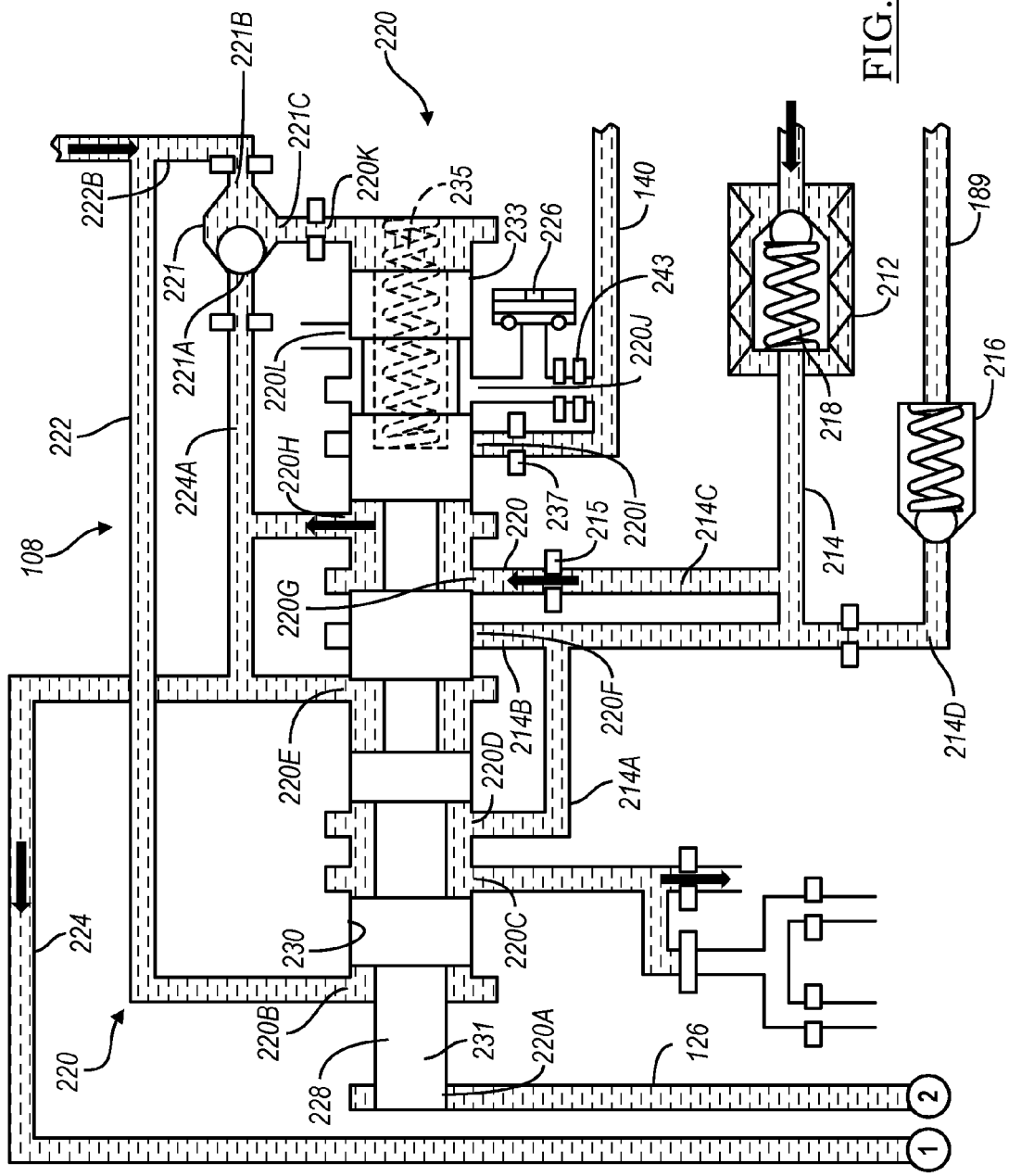
FIG. 2C is a diagram of a portion of the hydraulic control system in a third state according to the principles of the present invention.

The lubrication regulator valve assembly 220 further includes a valve 228 slidably disposed within a bore 230. The valve has a first end 231 and a second end 233. The valve 228 has three functional positions: a basic regulating position shown in FIG. 2A, a supplemental regulating position shown in FIG. 2B, and an override position shown in FIG. 2C. The valve 228 is moved between the positions based on a balance of forces acting on each of the first end 231 and the second end 233 of the valve 228. The basic regulating position provides an output pressure via fluid line 224 that is proportional to the line pressure (i.e. the pressure in fluid line 126). In the basic regulating position, line pressure via fluid line 126 enters port 220A and acts on an end of the valve 228 against the bias of a spring 235. As the valve 228 strokes against the spring 235, port 220F communicates with port 220E. Accordingly, hydraulic fluid flow from the cooler subsystem 106 communicates from fluid line 214B to port 220F, through the valve 228, and out fluid port 220E to fluid line 224. Feedback pressure from fluid line 224 communicates through branch 224A, through the ball check valve 221, and into the valve assembly 220. The hydraulic fluid acts on the valve 228 and creates a balancing force against the line pressure which keeps the valve 228 in a position to regulate the fluid flow to fluid line 224. In addition, ports 220I, 220J, 220C, and 220G are isolated by the valve 228, which in turn keeps the fluid pressure within fluid line 140 high which in turn allows the pressure switch 226 to sense a high pressure thereby indicating that the valve 228 is regulating fluid flow to fluid line 224.

If the fluid flow from the cooler subsystem 106 drops sufficiently, the line pressure acting on the valve 228 from fluid line 126 will move the valve 228 to the supplemental or stroked position. In the supplemental position, not only is fluid flow from the cooler subsystem 106 increased by opening port 220F to port 220E, but in addition port 220I is allowed to communicate with fluid port 220H. Accordingly, fluid flow from the feed limit valve 154 is communicated to the lubrication control valve 220 via fluid line 140, thereby increasing the fluid flow to fluid line 224. A flow restriction orifice 237 in fluid line 140 limits the flow of hydraulic fluid to the lubrication control valve 220.

Finally, the override position is achieved by activating a solenoid 240 (see FIG. 1C) that is in communication with fluid line 222A. The override position is activated during low line pressures (i.e. when the pump 118 is operating at a reduced speed due to engine idling). Solenoid 240 is an on/off solenoid that is multiplexed with the ETRS subsystem 110, as will be described in greater detail below. The hydraulic fluid flow from the solenoid 240, when activated, communicates with the ball check valve 221 via fluid line 222A. The ball check valve 221 prevents the fluid flow from the solenoid 240 from entering fluid line 224. As the fluid flow from the solenoid 240 enters port 220K, the hydraulic fluid contacts the valve 228 and, along with the spring 235, moves the valve to a de-stroked position. In the override position, port 220F is isolated from port 220E. However, port 220G is allowed to communicate with port 220H. Fluid flow from the cooler subsystem 106 via fluid line 214C is reduced by the relatively narrow override orifice 215. In addition, port 220D, previously isolated, is allowed to communicate with port 220C. Therefore, fluid flow from the cooler subsystem 106 is further reduced as fluid flow is diverted through branch 214A to port 220D, from port 220D to port 220C, and out port 220A to the sump 114. Finally, port 220J is allowed to communicate with port 220L, thereby allowing the fluid flow from the feed limit valve 154 via fluid line 140 to exhaust to the sump 114. However, due to gasket slots 243 positioned upstream of the pressure switch 226, the pressure between the pressure switch 226 and the exhaust port 220L drops. The drop in pressure sensed by the pressure switch 226 confirms that the valve 228 is in the override position. The override position greatly reduces the flow of hydraulic fluid to fluid line 224 and therefore to the components of the transmission, thereby reducing the parasitic spin loss. The override position is used under low power generation conditions, such as engine idle.

The lubrication regulator valve pressure switch 226 and the TCC control valve pressure switch 190 cooperate to diagnose a stuck pressure regulator valve assembly 132 or a stuck feed limit valve assembly 154. A non-pressurized state is assigned to the TCC applied position of the TCC control valve assembly 184 and to the lubrication override position of the lubrication valve assembly 220. Both pressure switches 226, 190 are fed with hydraulic fluid pressurized by the feed limit valve assembly 154. Depending on the commanded state of the valve assemblies 184, 220, both pressure switches 226, 190 indicating no pressure can be used as a diagnostic signal.

Returning to FIG. 1C, and with continued reference to FIGS. 1A and 1B, the ETRS control subsystem 110 will now be described. The ETRS control subsystem 110 uses line pressure hydraulic fluid from the pump 118 or the auxiliary pump 170 via fluid line 152 to engage a range selection via the clutch actuator subsystem 112. The ETRS control subsystem 110 is controlled using the hydraulic fluid from the feed limit control valve assembly 154 via fluid line 136. The ETRS control subsystem 110 includes previously described solenoid 240 as well as three additional solenoids 242, 244, and 246. Each of the solenoids 240, 242, 244, 246 are normally low, on-off solenoids that are each supplied with hydraulic fluid via fluid line 136. Fluid line 136 further provides hydraulic fluid to solenoid 148 (FIG. 1A). The solenoids 240, 242, 244, and 246 are used to actuate an ETRS valve assembly 250, a latch valve assembly 252, and first and second mode valve assemblies 254, 256.

The ETRS valve assembly 250 includes ports 250A-H. Port 250A communicates with fluid line 222A. Port 250B communicates with a fluid line 260. Port 250C communicates with a fluid line 262. Port 250D communicates with fluid line 152. Port 250E communicates with a fluid line 264. Port 250F communicates with a fluid line 266. Fluid line 266 communicates with solenoid 242. Port 250G is a one way exhaust port that communicates with the sump 114 which is used to improve the response time for the ETRS valve assembly 250 to de-stroke during a return to Park under extreme cold operating conditions. Finally, port 250H is an exhaust port that communicates with the sump 114.

The ETRS valve assembly 250 further includes a valve 268 slidably disposed within a bore 270. The valve 268 is actuated to a stroked position or out-of-Park position by the solenoid 240 and by hydraulic fluid acting on valve 268 delivered via fluid line 262 and to a de-stroked position or Park position by a spring 272 and by hydraulic fluid acting on the valve 268 delivered via fluid line 266. In the out-of-Park position, solenoid 240 is opened and fluid from line 222A contacts the valve 268 and moves the valve 268 against the spring 272. In addition, fluid from line 262 which is sourced by line pressure via the mode valves 254 and 256 and fluid line 152, contacts the valve 268 to stroke the valve. In this condition, port 250D communicates with port 250E. Accordingly, line pressure hydraulic fluid from fluid line 152 communicates to port 250D, from port 250D through the ETRS valve assembly 250 to port 250E, and from port 250E to fluid line 264. Fluid line 264 communicates with a Park servo assembly 276. The hydraulic fluid enters the Park servo assembly 276. The Park servo assembly 276 includes a piston 278 that moves upon contact by the hydraulic fluid, thereby mechanically disengaging a Park system (not shown). A Park inhibit solenoid assembly 280 is connected to the Park servo assembly 276. The Park inhibit solenoid assembly 280 a mechanical latching solenoid to hold the system out of Park if an operator wishes to have the vehicle mobile with the engine off. The Park inhibit solenoid assembly 280 also preferably includes two position switches, one mechanical and one Hall-effect, that confirm the position of the Park system to the engine controller and transmission controller to be used for diagnostic purposes.

In the Park position, solenoid 240 is closed and solenoid 242 is opened and the valve 268 is de-stroked by the spring 272 and by hydraulic fluid delivered from the solenoid 242 via line 266. In this position, port 250E communicates with port 250H and the Park servo assembly 276 exhausts, thereby engaging the Park system. The valve 268 is configured such that the spring 272 and hydraulic fluid from solenoid 242 will overcome the forces exerted on the valve 268 by any one of hydraulic fluid delivered by solenoid 240 and hydraulic fluid delivered via fluid line 262. If both sources of hydraulic fluid are present, the forces exerted on the valve 268 by hydraulic fluid from the solenoid 240 and hydraulic fluid delivered via fluid line 262 will overcome forces exerted on the valve 268 by the spring 272 and by hydraulic fluid from solenoid 242, thereby assuring a failed signal can be overcome. The Park controls are configured so that if all hydraulic pressure is lost in the hydraulic control system 100, the Park system is engaged.

The first mode valve assembly 254 includes ports 254A-K. Port 254A communicates with a fluid line 280. Port 254B communicates with a fluid line 282. Port 254C communicates with fluid line 152. Port 254D communicates with a fluid line 284. Port 254E communicates with a fluid line 286. Port 254F and 254J are exhaust ports that communicate with the sump 114. Port 254G communicates with a fluid line 288. Port 254H communicates with a fluid line 290. Port 254I communicates with a branch 137 of fluid line 136. Branch 137 communicates with solenoid 244 and with fluid line 136 via flow orifices 291. Port 254K communicates with fluid line 136 via a flow orifice 296.

The first mode valve assembly 254 further includes a valve 292 slidably disposed within a bore 293. The valve 292 is actuated by the solenoid 244 and a spring 294. When solenoid 244 is opened, fluid from line 136 communicates through solenoid 244 and moves the valve 292 against the spring 294. Accordingly, the valve 292 is moveable between a stroked position where the spring 294 is compressed and a de-stroked position, shown in FIG. 1C. Also acting against the spring 294 is the reverse oil (i.e. the hydraulic fluid used to initiate a reverse gear state) delivered to port 254H communicated via fluid line 290, the second mode valve assembly 256, fluid line 286, and fluid line 284 from the ETRS valve assembly 250. Acting with the spring 294 on the valve 292 is either out of park oil or return to park oil communicated via fluid line 280 from the ETRS valve assembly 250. In the stroked position, solenoid 244 is opened and fluid from line 137 contacts the valve 292 and moves the valve 292 against the spring 294. In this condition, port 254B communicates with port 254J and exhausts, ports 254C and 254D communicate with port 254E, port 254G communicates with port 254F and exhausts, and port 254K is closed.

In the de-stroked position, solenoid 244 is closed and the valve 292 is positioned by the spring 294 and hydraulic fluid via line 280. In this position, port 254B communicates with port 254C, ports 254E and 254D communicate with port 254F and exhaust, and port 254G communicates with port 254K. Accordingly, by stroking and de-stroking the valve 292, hydraulic fluid is diverted between fluid lines 282, 288 and fluid line 286.

The latch valve assembly 252 generally includes ports 252A-E. Ports 252A and 252B are exhaust ports that communicate with the sump 114. Port 252C communicates with a fluid line 300. Port 252D communicates with fluid line 280. Port 252E communicates with a fluid line 301 that in turn communicates with solenoid 246. The latch valve assembly 252 includes a valve 303 slidably disposed within a bore 305. The valve 303 is actuated by the solenoid 246 and a spring 307. When solenoid 246 is opened, fluid from line 136 communicates through solenoid 246 and line 301 and moves the valve 303 against the spring 307. The valve 303 is moveable between a stroked position where the spring 307 is compressed, shown in FIG. 1C, and a de-stroked position where the spring 307 is not compressed. In the stroked position, port 252C communicates with port 252B and exhausts and port 252D is blocked. In the de-stroked position, port 252C communicates with port 252D. The latch valve assembly 252 is operable to latch or engage the second mode valve assembly 256.

A ball check valve 309 is disposed between the ETRS valve 250 and the latch valve 252. The ball check valve 309 includes three ports 309A-C. Port 309A communicates with fluid line 260. Port 309B communicates with fluid line 266. Port 309C communicates with fluid line 280. The ball check valve 309 closes off whichever of the ports 309A and 309B that is delivering the lower hydraulic pressure and provides communication between whichever of the ports 309A and 309B having or delivering the higher hydraulic pressure and the outlet port 309C.

The second mode valve assembly 256 includes ports 256A-N. Ports 256A, 256D, 256J, and 256M are exhaust ports that communicate with the sump 114. Port 256B communicates with fluid line 300. Ports 256C and 256G communicate with a fluid line 302. Port 256E communicates with fluid line 290. Port 256F communicates with fluid line 286. Port 256H communicates with fluid line 282. Port 256I communicates with fluid line 311 that feeds solenoid 186. Port 256K communicates with fluid line 288. Port 256L communicates with a fluid line 306. Port 256N communicates with a fluid line 308.

The second mode valve assembly 256 further includes a valve 310 slidably disposed within a bore 312. The valve 310 is actuated by the solenoid 246 via the latch valve 252 and a spring 314 or directly through fluid line 301 and ball check valve 320. The valve 310 is moveable between a stroked state where the spring 314 is compressed, shown in FIG. 2B, and a de-stroked position. When solenoid 246 is opened, hydraulic fluid is communicated via line 301 to both the second mode valve assembly 256 and the latch valve assembly 252. The fluid communicated to the latch valve assembly 252 moves the valve 303 to its stroked state, thereby allowing communication from the solenoids 240 and 242 to the spring side of the valve 310 of the second mode valve assembly 256. If either solenoids 240 or 242 are opened (i.e. activating an out-of-Park or return to Park condition), hydraulic fluid communicates through ball check valve 309, to line 280, through the latch valve assembly 252, and to the second mode valve assembly 256 via line 300. This hydraulic fluid then keeps the valve 310 in the second position. If no fluid from solenoids 240 and 242 contact valve 310, the hydraulic fluid communicated from solenoid 246 moves the valve 310 to its stroked state.

In the stroked position, port 256C communicates with port 256D and exhausts, port 256E communicates with port 256F, port 256G is blocked, port 256I communicates with port 256H, port 256J is blocked, port 256L communicates with port 256K, and port 256M is blocked. In the de-stroked position, port 256C is blocked, port 256E communicates with port 256D and exhausts, port 256G communicates with port 256F, port 256H is blocked, port 256I communicates with port 256J and exhausts, port 256K is blocked, and port 256L communicates with port 256M and exhausts.

A latch oil circuit is defined by fluid line 136, fluid line 288, fluid line 306, a ball check valve 320, and fluid line 308. The ball check valve 320 includes three ports 320A-C. Port 320A communicates with fluid line 301. Port 320B communicates with fluid line 306. Port 320C communicates with fluid line 308. The ball check valve 320 closes off whichever of the ports 320A and 320B that is delivering the lower hydraulic pressure and provides communication between whichever of the ports 320A and 320B having or delivering the higher hydraulic pressure and the outlet port 320C. Latch oil is communicated through the latch oil circuit from line 136 when the first mode valve assembly 254 is in the de-stroked position and the second mode valve assembly 256 is in the stroked position. The latch oil communicates from line 136 through the first mode valve assembly 254, through line 288, through the second mode valve assembly 256, through line 306, through the ball check valve 320, and through line 308 to act on the valve 310.

Figure 1C:
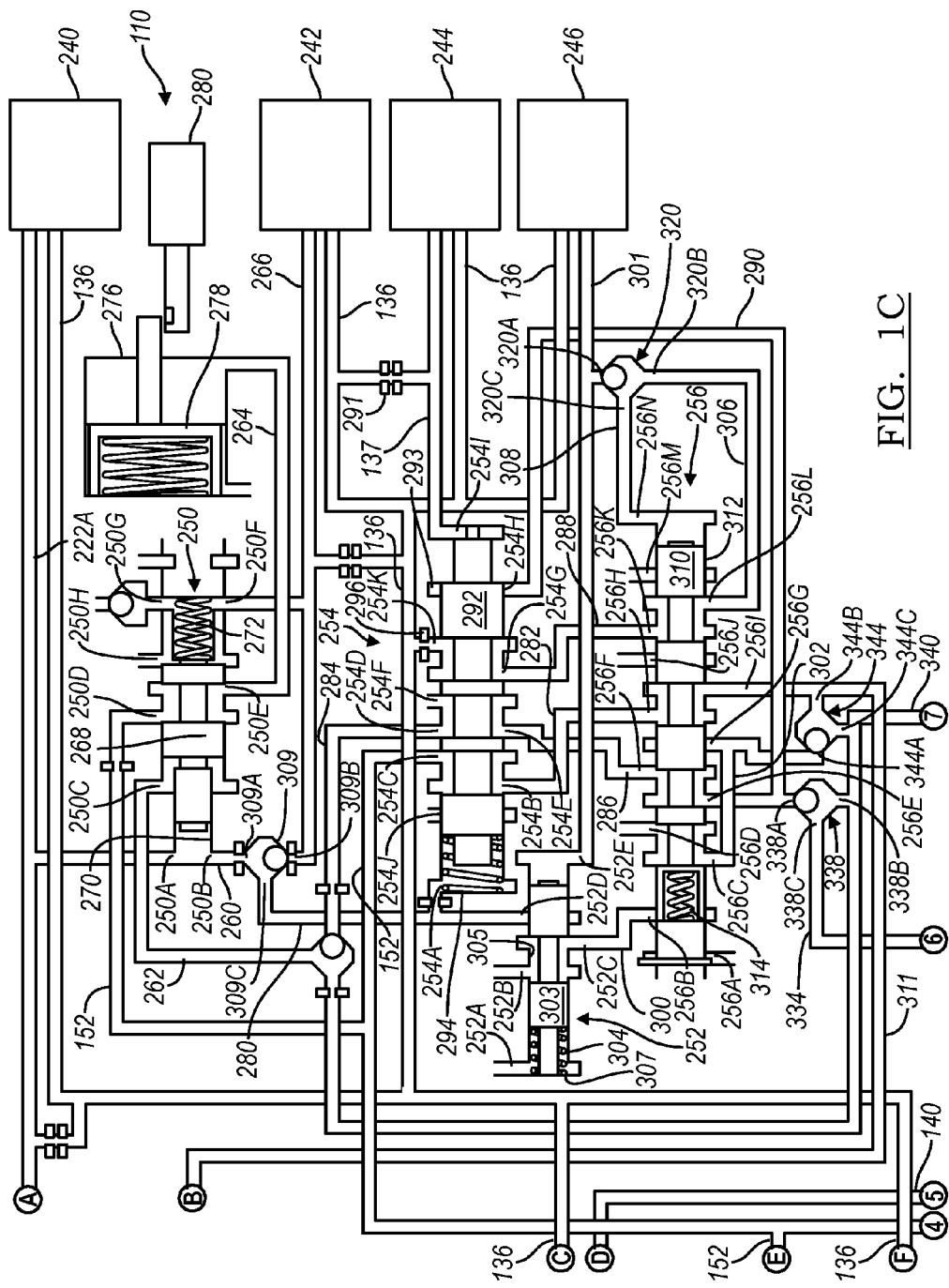
Figure 1D:
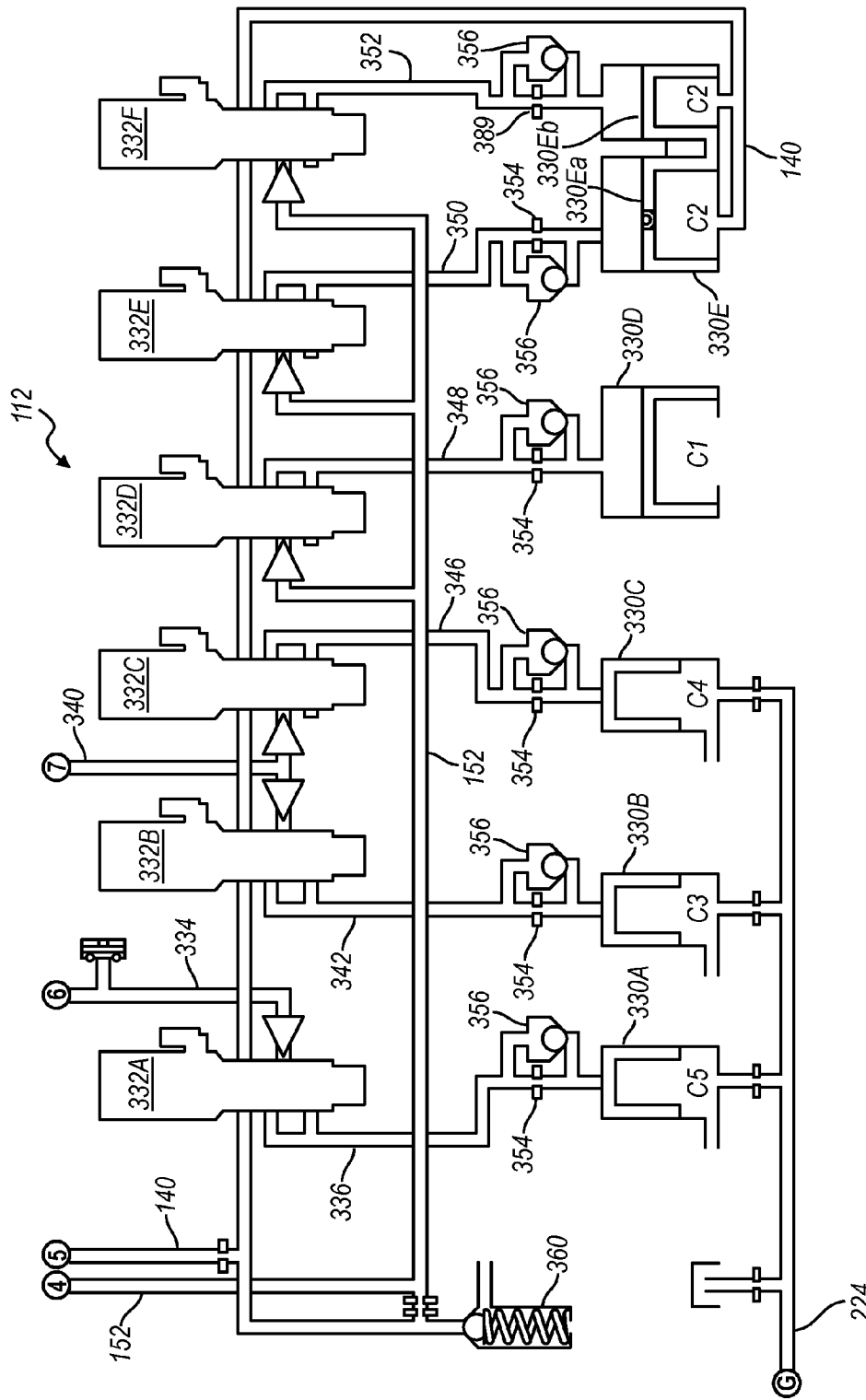

With reference to FIG. 1D and continued reference to FIG. 1C, the clutch control subsystem 112 provides hydraulic fluid to clutch actuators 330A-E. The clutch actuators 330A-E are hydraulically actuated pistons that each engage one of the plurality of torque transmitting devices to achieve various speed ratios. Clutch actuator 330E includes two apply areas 330Ea and 330Eb. Each of the clutch actuators 330A-E are controlled by a variable force solenoid 332A-F, with clutch actuator 330E controlled by two variable force solenoids 332E and 332F. This separate control of clutch actuator 330E provides maximum flexibility to tailor clutch torque characteristics to a wide range of high torque and low torque shifting conditions.

Solenoid 332A is in communication with a fluid line 334 and with a fluid line 336. Fluid line 334 communicates with a ball check valve 338. The ball check valve 338 includes three ports 338A-C. Port 338A communicates with fluid line 290. Port 338B communicates with a fluid line 340. Port 338C communicates with fluid line 334. The ball check valve 338 closes off whichever of the ports 338A and 338B that is delivering the lower hydraulic pressure and provides communication between whichever of the ports 338A and 338B having or delivering the higher hydraulic pressure and the outlet port 338C. Therefore, solenoid 332A is fed hydraulic fluid through the mode valves 254, 256 from fluid line 152 (i.e. by either drive oil or reverse oil and therefore can only be pressurized when the mode valves 254, 256 are positioned in the Drive or Reverse arrangement). Accordingly, an unintended gear engagement in Neutral if a clutch solenoid fails to a high pressure is prevented. Fluid line 336 delivers hydraulic fluid from the solenoid 332A to the shift actuator 330A.

Solenoid 332B is in communication with fluid line 340 and a fluid line 342. Fluid line 340 communicates with a ball check valve 344. The ball check valve 344 includes three ports 344A-C. Port 344A communicates with fluid line 302. Port 344B communicates with fluid line 311. Port 344C communicates with fluid line 340. The ball check valve 344 closes off whichever of the ports 344A and 344B that is delivering the lower hydraulic pressure and provides communication between whichever of the ports 344A and 344B having or delivering the higher hydraulic pressure and the outlet port 344C. Therefore, solenoid 332B is fed hydraulic fluid through the mode valves 254, 256 from fluid line 152 (i.e. by the drive oil and therefore can only be pressurized when the mode valves 254, 256 are positioned in the Drive arrangement). Fluid line 342 delivers hydraulic fluid from the solenoid 332B to the shift actuator 330B.

Solenoid 332C is in communication with fluid line 340 and a fluid line 346. Solenoid 332C is fed hydraulic fluid through the mode valves 254, 256 from fluid line 152 (i.e. by the drive oil and therefore can only be pressurized when the mode valves 254, 256 are positioned in the Drive arrangement). Fluid line 346 delivers hydraulic fluid from the solenoid 332C to the shift actuator 330C.

Solenoid 332D is in communication with fluid line 152 and is therefore fed hydraulic fluid from line pressure delivered by the pump 118. Solenoid 332D communicates the hydraulic fluid to the shift actuator 330D via a fluid line 348.

Solenoid 332E is in communication with fluid line 152 and is therefore fed hydraulic fluid from line pressure delivered by the pump 118. Solenoid 332E communicates the hydraulic fluid to the shift actuator 330Ea via a fluid line 350.

Solenoid 332F is in communication with fluid line 152 and is therefore fed hydraulic fluid from line pressure delivered by the pump 118. Solenoid 332F communicates the hydraulic fluid to the shift actuator 330Eb via a fluid line 352.

Each of the shift actuators 330A-C is fed lubrication oil via fluid line 224. Each of the solenoids 332A-F and the shift actuators 330D-E exhaust through fluid line 140. A safety valve 360 in communication with fluid line 140 is set at a predetermined pressure to regulate the pressure of the hydraulic fluid within the fluid line 140. This ensures that the clutch control circuits remain full when not being used to minimize response time. Fluid line 140 is fed by feed limit pressure oil.

Each of the solenoids 332A-F are chosen as either normally closed or normally open so that a single default gear can be attained in the case of electrical power loss. For example, if a sixth gear ratio is desired as the default forward speed during a power loss, solenoids 332A-C are chosen to be normally open and solenoids 332D-F are chosen to be normally closed.

In addition, each of the fluid lines 336, 342, 346, 348, 350, and 352 that feed the shift actuators 330A-F include an orifice 354 disposed in parallel with a one way valve 356. The orientation of the one-way valve 356 is such that the one way valve 356 allows communication from the clutch actuators 330A-E to the solenoids 332A-F and prevents fluid communication from the solenoids 332A-F to the shift actuators 330A-E. This arrangement forces oil feeding the shift actuators 330A-E to be controlled through the orifices 354.

The description of the invention is merely exemplary in nature and variations that do not depart from the general essence of the invention are intended to be within the scope of the invention. Such variations are not to be regarded as a departure from the spirit and scope of the invention.

We claim the following:

1. A hydraulic control system for a transmission, the transmission having a plurality of components, the hydraulic control system comprising:
a first source of pressurized hydraulic fluid for providing a first flow of hydraulic fluid;
a second source of pressurized hydraulic fluid for providing a second flow of hydraulic fluid;
a lubrication subsystem for communicating a pressurized hydraulic fluid to the plurality of components in the transmission in order to provide lubrication;
a fluid control device in communication with the first source of pressurized hydraulic fluid; and
a lubrication regulation valve in communication with the first and second sources of pressurized hydraulic fluid, the fluid control device, and the lubrication subsystem, the lubrication regulation valve having a valve moveable between at least three positions, wherein the valve allows fluid communication from the first source of pressurized hydraulic fluid to the lubrication subsystem when in the first position, wherein the valve allows fluid communication from the first source and the second source of pressurized hydraulic fluid to the lubrication subsystem when in the second position, and wherein the valve allows fluid communication from the first source of pressurized hydraulic fluid through the fluid control device to the lubrication subsystem when in the third position.

2. The hydraulic control system of claim 1 wherein the fluid control device is a flow restriction orifice operable to reduce the first flow of hydraulic fluid from the first source of pressurized hydraulic fluid.

3. The hydraulic control system of claim 1 wherein the first source of pressurized hydraulic fluid is a cooler subsystem in communication with a pump.

4. The hydraulic control system of claim 3 wherein the second source of pressurized hydraulic fluid is a valve assembly in communication with the pump for providing pressurized hydraulic fluid, wherein the valve assembly is operable to regulate a pressure of the hydraulic fluid from the pump.

5. The hydraulic control system of claim 1 wherein the valve is moved between the first and second positions by a first force acting on a first end of the valve and by a second force acting on a second end of the valve.

6. The hydraulic control system of claim 5 wherein the first force is from a flow of hydraulic fluid from a pump acting on the valve and the second force is from a biasing member acting on the valve and a feedback flow of hydraulic fluid from the lubrication control valve that is communicated back to the lubrication control valve acting on the valve.

7. The hydraulic control system of claim 1 further comprising a control device that communicates a flow of hydraulic fluid to the second end of the valve, and wherein the flow of hydraulic fluid from the control device acts on the valve and moves the valve to the third position.

8. The hydraulic control system of claim 1 wherein the position of the valve is a function of a fluid flow from a pump acting on the valve, a biasing member acting on the valve, a feedback flow of hydraulic fluid from the lubrication control valve acting on the valve, and a control signal acting on the valve from a control device.

9. A hydraulic control system for a transmission, the transmission having a pump for providing hydraulic fluid, the hydraulic control system comprising:
a first source of pressurized hydraulic fluid in communication with the pump;
a second source of pressurized hydraulic fluid in communication with the pump;
a lubrication subsystem for communicating the hydraulic fluid through the transmission in order to provide lubrication to the transmission;
a fluid control device in communication with the first source of pressurized hydraulic fluid;
a lubrication regulation valve having a first inlet port in communication with the first source of pressurized hydraulic fluid, a second inlet port in communication with the fluid control device, a third inlet port in communication with the second source of pressurized hydraulic fluid, a control port in communication with the pump, a first outlet port in communication with the lubrication subsystem, a second outlet port in communication with the lubrication subsystem, and a feedback port in communication with the first outlet port and the second outlet port, the lubrication regulation valve having a valve, wherein the valve is moveable between at least a first position, a second position, and a third position, wherein the first inlet port is in communication with the first outlet port when the valve is in the first position, wherein the first inlet port is in communication with the first outlet port and the third inlet port is in communication with the second outlet port when the valve is in the second position, and wherein the second inlet port is in communication with the second outlet port when the valve is in the third position; and
a control device operatively associated with the lubrication regulation valve, the control device operable to move the valve between the third position and the first position, and
wherein the position of the valve between the first position and the second position is a function of at least the hydraulic fluid acting on the valve from the control port and hydraulic fluid acting on the valve from the feedback port.

10. The hydraulic control system of claim 9 wherein the position of the valve between the first position and the second position is further a function of a biasing member acting on the valve in the same direction as the hydraulic fluid acting on the valve from the feedback port.

11. The hydraulic control system of claim 9 wherein the lubrication regulation valve further includes a fourth inlet port and a first exhaust port, wherein the fourth inlet port is in communication with the first source of hydraulic fluid, and wherein the fourth inlet port is in communication with the first exhaust port when the valve is in the third position.

12. The hydraulic control system of claim 9 further comprising a ball check valve having a first inlet in communication with the first and second outlet ports of the lubrication regulation valve, having a second inlet port in communication with the control device, and having an outlet in communication with the feedback port, wherein the ball check valve closes the outlet of the ball check valve to whichever of the first inlet and second inlet of the ball check valve that provides a lower flow of hydraulic fluid to the ball check valve.

13. The hydraulic control system of claim 9 wherein the lubrication regulation valve further includes a fifth inlet port and a second exhaust port, wherein the fifth inlet port is in communication with the second source of hydraulic fluid, and wherein the fifth inlet port is in communication with the second exhaust port when the valve is in the third position.

14. The hydraulic control system of claim 13 further comprising a fluid restriction orifice disposed between the second source of hydraulic fluid and the fifth inlet port and further comprising a pressure switch disposed between the fluid restriction orifice and the fifth inlet port, wherein the pressure switch is operable to sense a pressure of the hydraulic fluid in order to determine whether the valve is in the third position.

15. The hydraulic control system of claim 9 wherein the fluid control device is a flow restriction orifice operable to reduce the first flow of hydraulic fluid from the first source of pressurized hydraulic fluid.

16. The hydraulic control system of claim 9 wherein the first source of pressurized hydraulic fluid is a cooler subsystem in communication with the pump.

17. The hydraulic control system of claim 16 wherein the second source of pressurized hydraulic fluid is a valve assembly in communication with the pump, wherein the valve assembly is operable to regulate a pressure of the hydraulic fluid from the pump.

18. The hydraulic control system of claim 17 wherein the control device is an on/off solenoid in communication with the valve assembly, wherein the control device is operable to allow selective communication of the hydraulic fluid from the valve assembly to the feedback port of the lubrication regulation valve.

* * * * *